Sept. 1, 1931.  A. BRIECHLE  1,821,492
AERIAL CAMERA CONTROL MECHANISM
Filed May 8, 1930  4 Sheets-Sheet 1

INVENTOR
Ambrosius Briechle
BY
ATTORNEYS

Sept. 1, 1931.   A. BRIECHLE   1,821,492
AERIAL CAMERA CONTROL MECHANISM
Filed May 8, 1930   4 Sheets-Sheet 2

Fig. 3.

INVENTOR
Ambrosius Briechle
BY
Hoguet & Neary
ATTORNEYS

Sept. 1, 1931.    A. BRIECHLE    1,821,492
AERIAL CAMERA CONTROL MECHANISM
Filed May 8, 1930    4 Sheets-Sheet 3

INVENTOR
Ambrosius Briechle
BY
Hoguet & Neary
ATTORNEYS

Sept. 1, 1931.　　　　A. BRIECHLE　　　　1,821,492
AERIAL CAMERA CONTROL MECHANISM

Filed May 8, 1930　　　4 Sheets-Sheet 4

Patented Sept. 1, 1931

1,821,492

UNITED STATES PATENT OFFICE

AMBROSIUS BRIECHLE, OF NEW YORK, N. Y., ASSIGNOR TO FAIRCHILD AERIAL CAMERA CORPORATION, OF NEW YORK, N. Y., A CORPORATION OF NEW YORK

AERIAL CAMERA CONTROL MECHANISM

Application filed May 8, 1930. Serial No. 450,672.

This invention relates in general to photographic cameras and more particularly to aerial cameras, and has for its object to provide a camera in which a series of exposures may be rapidly made.

Another object of the invention is to provide a camera having convenient gripping handles and control levers so arranged that the operator need not release the handles in making a series of exposures.

To this end it is proposed to provide such a mechanism that will enable the winding of the film and the setting of the shutter to be accomplished by the rotation of one of the handles, the other handle remaining stationary.

Another object of the invention is to so arrange a shutter release that it will be convenient for operation without the photographer releasing his hold on either of the handles.

A further object is to provide mechanism for the prevention of double exposure of the photographic sensitive material. To this end it is proposed to provide positive means whereby it will be impossible to trip the shutter until the film-winding and shutter setting handle has been rotated to its limit and return, insuring that proper amount of film has been wound and the shutter correspondingly fully set, it being impossible to trip the shutter while the handle is in any position intermediate of this film wind and return. It is also proposed to provide positive means whereby it will be impossible to move the handle when the shutter is set to be tripped until the shutter is released. It is also proposed to provide positive means for preventing a return movement of the operating handle during the winding of the film after the shutter has been tripped until the film has been fully wound.

With the foregoing and other objects in view, the invention consists in the combination of parts and in the details of construction hereinafter referred to in the following specification and appended claims, certain embodiments thereof being illustrated in the accompanying drawings, in which:
Figure 1 is a view in elevation of the film winding, shutter setting, and shutter release control unit, the mechanism being shown in the normal position when the control handle is pulled back and the film is wound and the shutter is set and ready to be tripped.

Figure 3 is a view similar to Figure 1 showing the position of the parts of the mechanism after the tripping of the shutter.

Figure 6:
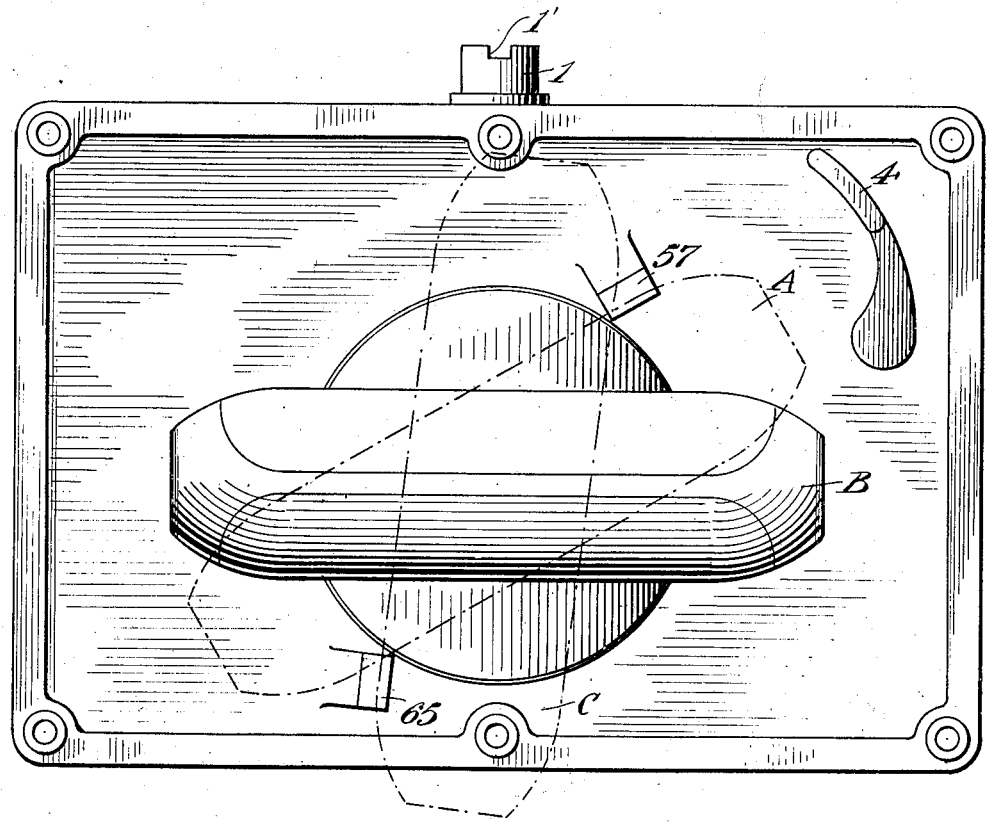
Figure 6 is a front elevation of the outside plate of the control unit with the handle shown diagrammatically in three stages of its operation.

The camera may be held and positioned by handles conveniently arranged on the sides of the camera body. One of these handles is mounted for rotary movement relative to the camera body and mechanism is provided whereby the movement of the handle controls the setting of the shutter and the winding of the film. Figure 6 shows three different positions A, B and C of the operating handle, and also shows the relative position of the shutter release 4.

The entire device disclosed in the drawings is of the character of an interchangeable detachable unit which may be fitted on to the camera body and is provided with a suitable operating shaft 1 with a recess 1' to receive a complementary shaft in the film winding mechanism of a detachable magazine of the well-known Fairchild design of aerial camera in which the magazine body and cone are separably attached to each other so as to be interchangeable. The unit is particularly adapted for use in cameras employing a between-the-lens shutter, a shutter setting operating sleeve 2 and a shutter release operating sleeve 3 being respectively provided with cross rods 2' and 3' for receiving the ordinary shutter actuating elements common to aerial cameras employing the type of shutter mentioned.

Figure 1:
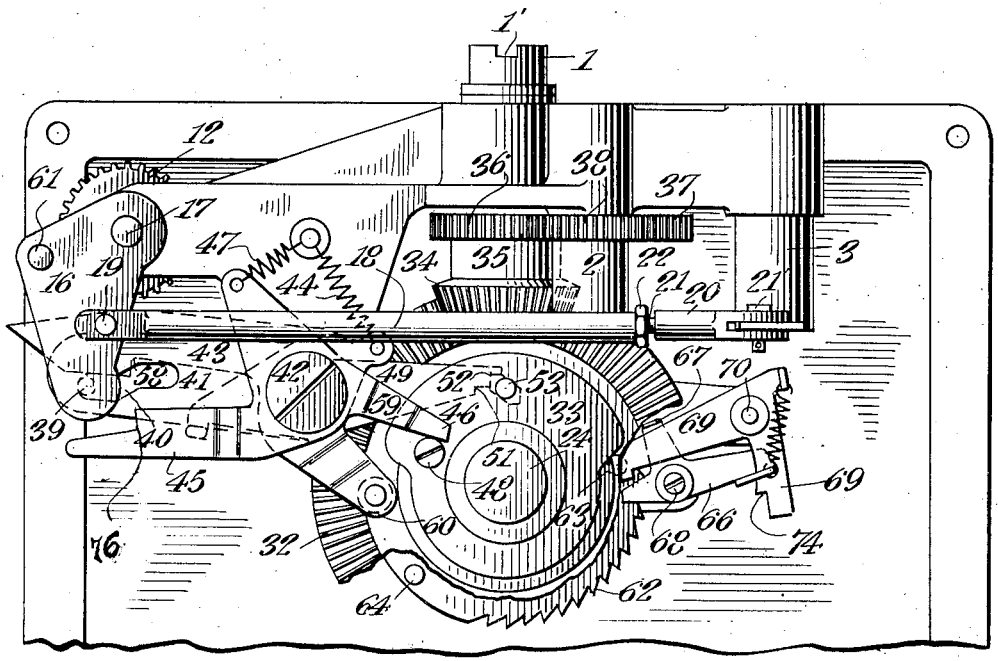
Figure 2:
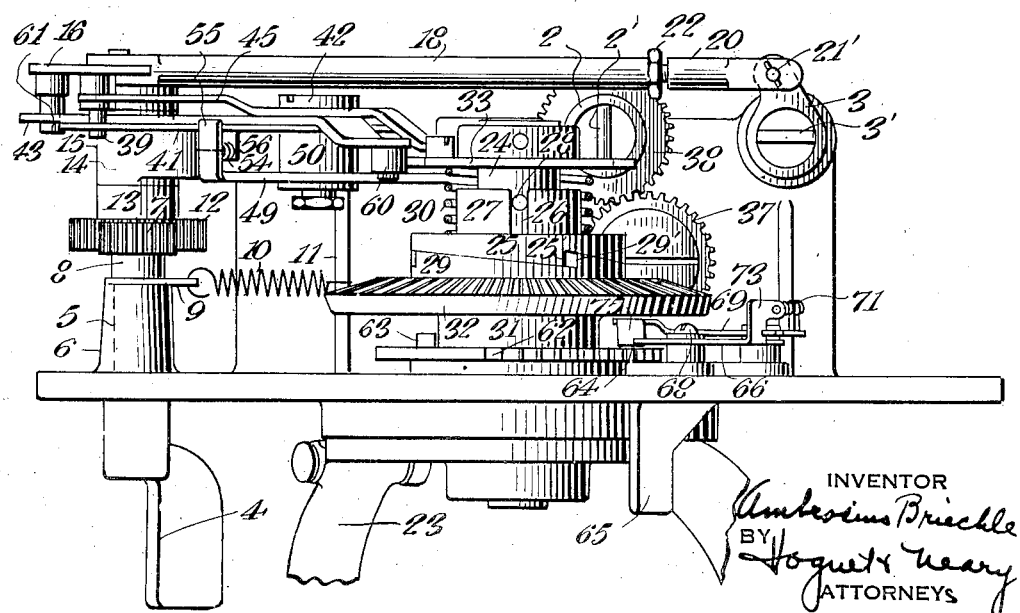
Figure 2 is a bottom plan view of that shown in Figure 1.

Figures 1 and 2 show the film winding and shutter control unit in a position corresponding to that in actual use in a camera when the film has been wound and the shutter is ready to be tripped, the winding handle being in the position shown at A in Figure 6. A downward pressure by the thumb on the shutter release 4 in an anti-clockwise direction imparts a like rotation of a shaft 5 shown in dotted lines extending through the cast bearing 6. A ring gear 7 with a sleeve 8 is keyed to the shaft 5, the sleeve also having an integral lug 9. A tension spring 10 is arranged between the lug 9 and a casting rib 11 to resist anti-clockwise rotation of the shaft 5 and to return it to the position shown in Figure 2.

The ring gear 7 meshes with a larger ring gear 12 carried by a sleeve 13 secured to a shaft 14, shown in dotted lines. This shaft extends through a cast bearing 15 and rotates a plate 16 excentrically pivoted at 17, which is keyed to the shaft. A rod 18 forked at one end to straddle the plate is secured thereto by a pin 19 passing through the two prongs of the fork and a slightly elongated slot in the plate to allow for some lost motion in the movement of the rod 18 by the operating plate 16. A short rod 20 is secured to a flange of the shutter tripping control shaft 3 and is secured thereto by a pin 21'. The rod 18 is interiorly screw-threaded to receive the threads 21 of the rod 20 and the proper operating length of the two combined operating rods is effected by the nut 22.

The operating handle 23 is keyed to a shaft 24 which in turn has a cam plate 33 keyed thereto. A clutch element 25 is slipped over this shaft and has a slot 26 on its sleeve 27 to receive a pin 28 secured to the shaft and thus any rotation of the shaft effects a corresponding rotation of the clutch element 25. A sleeve 31 carrying a bevel gear 32 is loosely slipped over the shaft 24 and also carries a complementary clutch element 29. Element 25 is constantly forced against element 29 by the compression spring 30. A movement of the handle and consequent rotation of the shaft 24 from left to right, as shown in Figure 2, results in a corresponding rotation of gear 32 upon the engagement of the faces 25' and 29' of the clutch members. A reverse rotation of the handle merely rotates clutch member 25 which slides over member 29 which is not affected.

The film is wound and the shutter set by means of the rotation of the handle 23, in the following manner. The bevel gear 32 meshes with a bevel gear 34, which is secured to the shaft 1 for the winding of the film in the detachable magazine. The sleeve 35 which carries the gear 34 also carries a ring gear 36 which, in turn, operates a ring gear 38 carried by the sleeve 2 through an idler ring gear 37. The rotation of the sleeve 2 by the gear 38 effects the setting of the shutter, the additional means for accomplishing the actual operation of the shutter by this sleeve 2 being well enough known in the art to obviate a further illustration thereof.

As shown in Figures 1 and 2, a lug 39 of the plate 16 fits in the left-hand portion of the elongated arcuate slot 40 of a loose plate 41 pivoted on the bolt 42. A lever 43 is also pivoted on the bolt 42 and is superimposed upon the plate 41, a spring 44 being provided for forcing the lever against the lug 39. A third lever 45 is superimposed upon the lever 43 and pivoted on the bolt 42, this lever having an arm 46 spring pressed by means of the spring 47 against a lug 48 on the face of the cam plate 33. Another lever 49 is also mounted on the bolt 42 underneath the casting 50 and has an arm notched at 51 and 52, the latter being shown in Figure 1 as engaging a pin 53 on the under surface cam plate 33. This lever 49 is spring pressed into this position by means of the spring 54 extending between the lug 55 of the lever 49 and the lug 56 of the plate 41.

Figure 7:
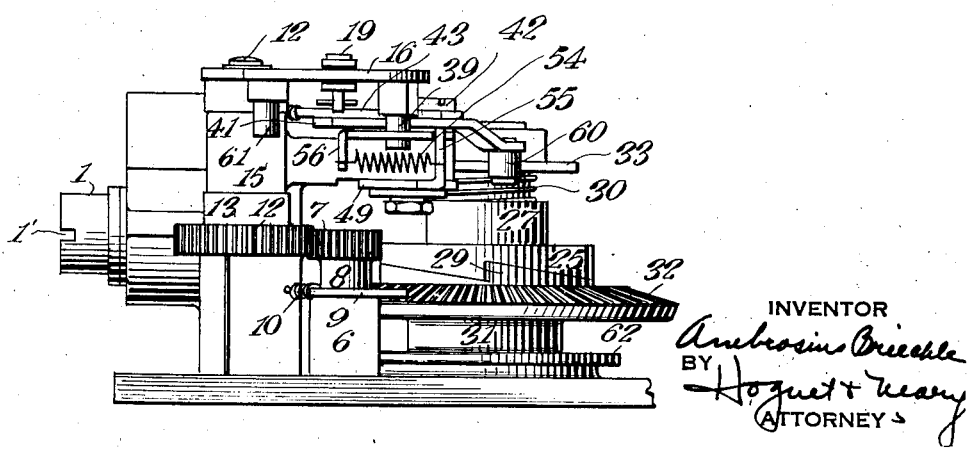
Figure 7 is a top plan view of the inner mechanism of the control unit with the parts in their same relative position, as shown in Figures 1 and 2, in which the shutter is ready to be tripped.

The position of the mechanism shown in Figures 1, 2 and 7 cannot be changed until after the shutter has been tripped. The stop 57 on the casting prevents a movement of the handle in counter clockwise direction. Until after the shutter has been tripped the pin 53, by its engagement with the notch 52 of the lever 49, prevents the rotation of the shaft 24 in a direction corresponding to the rotation handle in a clockwise direction.

The operation of the shutter release 4 not only causes a rotation of the sleeve 3 through the coaction of the plate 16 and the operating rods 18 and 20 but also renders it possible to again wind the handle in a clockwise direction in order to reset the shutter and wind the film.

As shown in Figure 3, the shutter having been tripped, the lug 39 of the plate 16 has moved toward the right-hand extremity of the slot 40 in the plate 41 and due to the excentric nature of the slot has forced the plate 41 in a downwardly direction and thus disengaging the notches 51 and 52 from the pin 53 of the cam plate 33. Simultaneously with this action, the lever 43 under tension of the spring 44 is forced downwardly so as to engage the lug 39 in the notch 58 of the lever 43, thus preventing a return of the shutter release to the position shown in Figure 1 in which figure the shutter was ready to be tripped.

Figure 4:
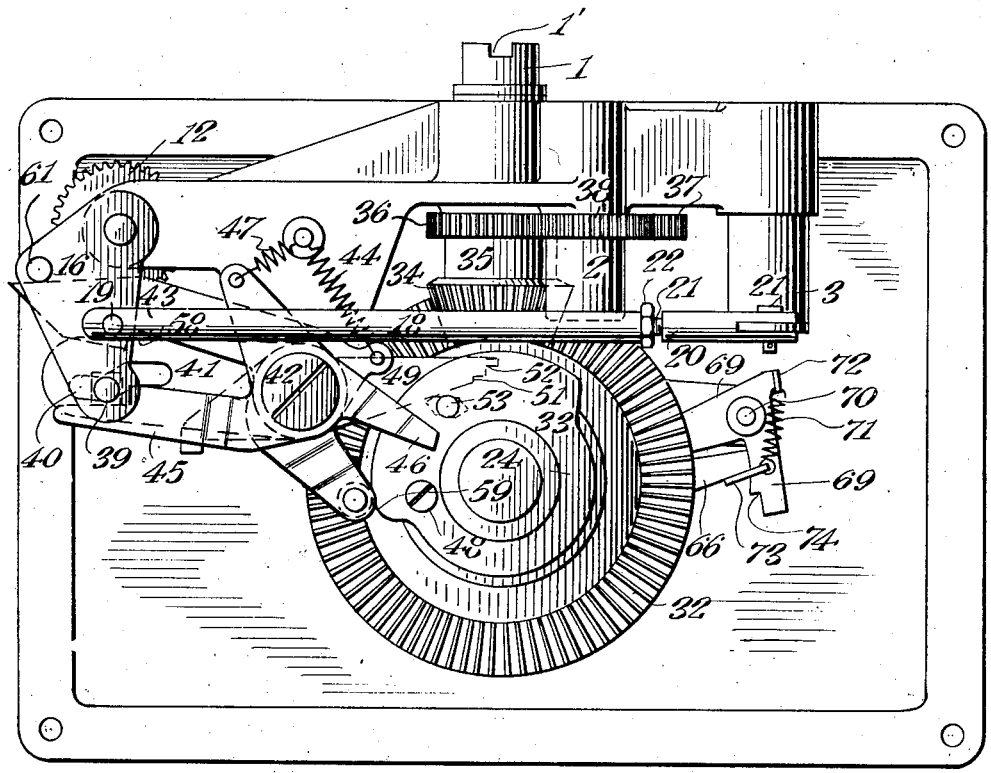
Figure 4 is a view similar to Figure 3 showing the position of the parts of the mechanism after the shutter has been tripped and the control handle has been moved approximately 10° in the winding of the film.

The operating handle is then free to be moved in a clockwise direction to wind the film and reset the shutter. Figure 4 shows the relation of the parts of the mechanism to one another after the handle has been moved through a portion of the winding operation and is approximately illustrated at the position B in Figure 6. This much rotation of the cam plate 33 has caused the excentric portion 59 of the plate to engage a roller 60 of the lever 43, leaving the notched portion free from engagement with the lug 39 against the action of the spring 44, and has also allowed the return of the lug 39 towards the left-hand extremity of the slot 40. The upper surface of the lever 43 now impinges against the lower surface of the pin 61 carried by the plate 16 rendering it impossible to operate the shutter releasing mechanism and this is equally true during all of the movement of the shaft 24 whenever the roller 60 is in contact with the enlarged portion 59 of the cam plate 33.

Figure 5:
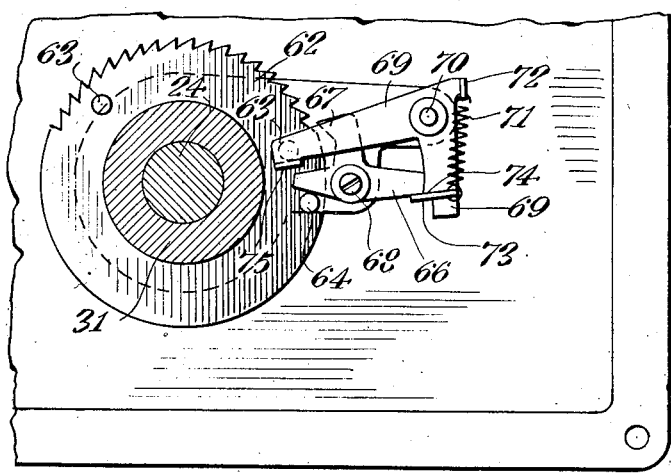
Figure 5 is an enlarged detailed view of the ratchet and ratchet wheel for preventing the return of the operating handle during the film winding movement until the film has been fully wound.

There is also secured to the shaft 24 a segment ratchet gear 62 provided with lugs 63 and 64. Figure 5 shows the position of the ratchet gear after the film has been wound and the shutter has been set and the position of the operating handle corresponds to that illustrated at C in Figure 6, a further motion being limited by the stop 65 mounted on the casting. As in Figure 5 the lug 64 has engaged the lower end of the lever 66 about its pivot 68. The effect of this engagement is to force pawl 67, carried by the lever 66, out of engagement with the teeth of the ratchet gear 62 and allow a return movement of the gear in a direction from left to right in reference to Figure 5. The engagement of the lug 64 with the lever 66 also forces the lever 69 to turn about its pivot 70 through the action of the spring 71 extending between the flange 72 of the lever 69 and the flange 73 of the lever 66. This engagement of the lug 64 with the lever 66 is of sufficient duration to force the flange 73 of the lever 66 into engagement with the notch 74 which maintains the relative positions of the two operating levers and thus keeps the pawl out of engagement with the ratchet gear. This nonengagement will exist through the return movement of the handle until the lug 63 strikes the flange 75 of the lever 69, causing the latter to rotate, which, in turn, releases the flange 73 from engagement with the notch 74 and again allowing the pawl 67 to be forced into engagement with the ratchet gear under the action of the spring 71.

In summarizing the interaction of the mechanisms controlled by the winding handle and the shutter release lever, assume the shutter to be ready to be tripped. An operation of the lever 4 causes the lug 39 to move to the right in the slot 40 of lever 41 causing the latter to be depressed and force the lug 55 of the lever 49 downwardly. The lever 49 is thus rocked on its pivot 42 moving the notch 52 out of engagement with the lug 53 of the cam plate 33. Simultaneously the lug 39 is engaged behind the notch 58 of the lever 43 and thus it is impossible to return the lever to the position shown in Fig. 1 for tripping.

As shown in Fig. 2, this action of the lever 43 throws the roller 60 against the circumference of the small part of the cam plate 33. A slight rotation of the cam plate causes its enlarged portion to engage the roller, throwing the end of the lever 43 notched at 58 upwardly, and the spring 10 throws the lug 39 to the left. In this immediate position, the roller 60 has merely started on the incline toward the greatest enlarged portion of the cam plate, and the shutter release lever assumes the same initial position as shown in Fig. 1. A tripping of the shutter, however, is prevented by reason of the fact that an attempt to do so results in the abutment of the lug 39 against the notch 76 of the lever 45.

Upon a further rotation of the handle, the cam plate by engagement with the roller 60 forces the lever 43 against the lug 61 as shown in Fig. 4 preventing movement of the lever 4. Upon return movement of the handle, the same condition prevails until the roller 60 starts down the incline on the cam plate to the smaller part thereof, whereupon the lever 43 is forced away from lug 61 but a tripping of the shutter is prevented by lug 39 again striking the notch 76 of the lever 45 when the lever 4 is actuated. This is so, even after notch 51 of the lever 49 has engaged lug 53 of the cam plate. The final return movement of the cam plate, necessary to cause notch 52 to engage lug 53, forces the end of the lever 45 with the notch 76 downwardly through the upward pressure of the cam plate lug 48 on the end 46 of the lever 45, thus throwing this lever clear for the movement of the lug 39 to the right and rendering it possible to trip the shutter. The above described movement of the handle has in the meantime effected the winding of the film and the shutter may at this time properly be tripped.

While the control unit has been specifically described as adaptable for use in connection with the well-known Fairchild camera employing a between-the-lens shutter, it is equally adaptable for use in connection with any type of camera, whether it be of the aerial camera type or not, and in aerial cameras it may be conveniently applied and used to advantage, whether the shutter be of the between-the-lens or the focal-plane type.

Having thus described my invention, I claim:

1. In combination with an aerial camera, a control unit comprising a movable camera gripping handle, a shaft rotatable thereby and a gear loosely mounted on said shaft with clutch means between the shaft and gear for operating said gear, said gear being movable relative thereto in the opposite direction, said gear being adapted to drive suitable gears for the operation of shafts for the purpose of setting the shutter and winding the film in said camera, a cam plate carried by said shaft, and shutter release lever arranged adjacent to said handle and adapted for operation without releasing the grip thereon, coacting levers connected to said shutter releasing mechanism and engaging said cam plate for preventing the tripping of said shutter after it had been tripped, until the handle has been fully operated to its limit in one direction and returned to its normal position corresponding to that in which the shutter is ready to be tripped.

2. In combination with an aerial camera, a control unit comprising a movable camera gripping handle, and mechanism actuated thereby for regulating the winding of film and the setting of the shutter, and a lever adjacent to said handle for controlling the release of said shutter, double-exposure prevention means including mechanism for preventing operation for the shutter control before the film winding and shutter setting control has been operated after the initial winding, the return of the film winding control intermediate of its full operation, and the operation of the film winding control prior to the operation of the shutter release control after the initial shutter release, said mechanism including a shaft driven by the turning of said gripping handle, a gear loosely mounted on said shaft with clutch means between the shaft and gear for operating said gear, a cam plate carried by said shaft, a shutter release member arranged adjacent to said handle, coacting devices connected to said shutter releasing mechanism and engaging said cam plate.

3. In combination with an aerial camera, a control unit comprising a movable camera gripping handle, and mechanism actuated thereby for regulating the winding of film and the setting of the shutter, and a lever adjacent to said handle for controlling the release of said shutter, a main shaft secured to said handle, means carried by said shaft for operating shafts effecting the winding of film and the setting of the shutter of said camera, another shaft actuated by said lever for releasing said shutter, a series of superimposed levers pivotally mounted on the casing of said unit, said levers being cojointly actuated by said main shaft and the shutter release control lever for the purpose of positively maintaining a predetermined possible sequence of operation of said control handle and shutter release lever.

4. In combination with an aerial camera, a control unit comprising a movable camera gripping handle, and mechanism actuated thereby for regulating the winding of film and the setting of the shutter, and a lever adjacent to said handle for controlling the release of said shutter, a main shaft secured to said handle, a gear loosely carried thereby with clutch means for the operation of said gear by said handle in one direction only, said gear being adapted to drive elements for the winding of film and the setting of said shutter, another shaft actuated by said lever for releasing said shutter, a series of superimposed levers pivotally mounted on the casing of said unit, means carried by said main shaft and said shutter release for actuating said levers for effecting a control of the operation of said handle by said shutter release lever and vice versa.

5. In combination with an aerial camera, a control unit comprising a movable camera gripping handle, and mechanism actuated thereby for regulating the winding of film and the setting of the shutter, and a lever adjacent to said handle for controlling the release of said shutter, a main shaft secured to said handle, a gear loosely carried thereby with clutch means for the operation of said gear by said handle in one direction only, said gear being adapted to drive elements for the winding of film and the setting of said shutter, another shaft actuated by said lever for releasing said shutter, a series of superimposed levers pivotally mounted on the casing of said unit, means carried by said main shaft and said shutter release for actuating said levers for effecting a control of the operation of said handle by said shutter release lever and vice versa, for maintaining a predetermined possible sequence of operation thereof.

6. In combination with an aerial camera, a control unit comprising a movable camera gripping handle, and mechanism actuated thereby for regulating the winding of film and the setting of the shutter, and a lever adjacent to said handle for controlling the release of said shutter, a main shaft secured to said handle, a gear loosely carried thereby with clutch means for the operation of said gear by said handle in one direction only, said gear being adapted to drive elements for the winding of the film and the setting of said shutter, another shaft actuated by said lever for releasing said shutter, a series of superimposed levers pivotally mounted on the casing of said unit, means carried by said main shaft and said shutter release for actuating said levers for effecting a control of the operation of said handle by said shutter release lever and vice versa, a ratchet gear also carried by said main shaft and a coacting pawl pivoted on said casing, actuating lugs carried by said gear for throwing said pawl into and out of engagement with said gear for permitting rotation of said handle in one direction and preventing the return opposite movement prior to a predetermined point in the permitted movement.

7. In combination with an aerial camera having mechanism for winding the film and setting the shutter, a control unit therefor comprising a camera gripping handle, an element driven thereby for causing the setting of the shutter, a member carried by said element for causing the winding of the film, clutch means interposed between said member and said element, means adjacent the gripping handle for controlling the tripping of the shutter, coacting devices connected to said shutter releasing mechanism and engaging said shutter setting mechanism for preventing the tripping of said shutter, after it has been tripped, until the handle has been fully operated to its limit in one direction and returned to its normal position corresponding to that in which the shutter is ready to be tripped.

8. In combination with an aerial camera, a control unit comprising a movable camera gripping handle, a shaft rotatable thereby and a gear loosely mounted on said shaft with clutch means between the shaft and gear for operating said gear, said gear being movable relative thereto in the opposite direction, said gear being adapted to drive suitable gears for the operation of shafts for the purpose of setting the shutter and winding the film in said camera, shutter setting mechanism carried by said shaft, and shutter release lever arranged adjacent to said handle and adapted for operation without releasing the grip thereon, coacting devices connected to said shutter releasing mechanism and engaging said shutter setting mechanism for preventing the tripping of said shutter, after it had been tripped, until the handle has been fully operated to its limit in one direction and returned to its normal position corresponding to that in which the shutter is ready to be tripped.

In testimony whereof, I have signed my name to this specification this 6th day of May, 1930.

AMBROSIUS BRIECHLE.